United States Patent
Bandyopadhyay et al.

(10) Patent No.: US 10,963,433 B2
(45) Date of Patent: Mar. 30, 2021

(54) ASCII BASED INSTANT OBJECT ORIENTED SCHEMA GENERATION

(71) Applicant: International Business Machines Corporation, Armonk, NY (US)

(72) Inventors: Santanu Bandyopadhyay, Kolkata (IN); Suryanarayana Rao, Bangalore (IN); Ramesh Chandra Pathak, Bangalore (IN); Sougata Mukherjea, New Delhi (IN)

(73) Assignee: International Business Machines Corporation, Armonk, NY (US)

(*) Notice: Subject to any disclaimer, the term of this patent is extended or adjusted under 35 U.S.C. 154(b) by 102 days.

(21) Appl. No.: 16/104,485

(22) Filed: Aug. 17, 2018

(65) Prior Publication Data
US 2020/0057816 A1    Feb. 20, 2020

(51) Int. Cl.
G06F 16/00    (2019.01)
G06F 16/21    (2019.01)
(Continued)

(52) U.S. Cl.
CPC .......... *G06F 16/212* (2019.01); *G06F 16/213* (2019.01); *G06F 16/2228* (2019.01);
(Continued)

(58) Field of Classification Search
CPC .... G06F 16/212; G06F 16/213; G06F 16/252; G06F 16/289; G06F 16/2228; G06F 40/205; G06N 20/00
See application file for complete search history.

(56) References Cited

U.S. PATENT DOCUMENTS 5,021,992 A  *  6/1991  Kondo .................... G06N 5/02
                                                         706/50
5,596,746 A      1/1997  Shen et al.
(Continued)

FOREIGN PATENT DOCUMENTS

WO    WO2018039049 A1    3/2018

OTHER PUBLICATIONS

Elbendak et al.,"Parsed use case descriptions as a basis for object-oriented class model generation",2011,Elsevier,pp. 1-15 (Year: 2011).*
(Continued)

*Primary Examiner* — Alexander Khong
(74) *Attorney, Agent, or Firm* — Scully, Scott, Murphy & Presser, P.C.; Michael A. Petrocelli, Esq.

(57) ABSTRACT

A method, a system and a computer program product for automated ASCII-based object-oriented database schema (OODBS) generation. A parser runs through text sentences of a textual document from a requirements gathering team that includes object-oriented application requirements, and identifies nouns corresponding to an object, and each noun's attributes. An Object-oriented dictionary based ASCII interpreter analyzes the ASCII of the captured requirements. For each identified noun, the system creates first key-value structures mapping each identified object to one or more associated attributes. There is further identified, from the created first key-value structures, any attributes that reference to an identified object, and for each of these identified objects, the system creates second key-value structures mapping, for each attribute identified as a reference, associating a corresponding key where the reference is found as an attribute. An ASCII-based OODB schema is generated based on the first key-values and second key-value structures mappings.

16 Claims, 8 Drawing Sheets

(51) Int. Cl.
*G06N 20/00* (2019.01)
*G06F 16/25* (2019.01)
*G06F 16/28* (2019.01)
*G06F 16/22* (2019.01)
*G06F 40/205* (2020.01)

(52) U.S. Cl.
CPC .......... *G06F 16/252* (2019.01); *G06F 16/289* (2019.01); *G06N 20/00* (2019.01); *G06F 40/205* (2020.01)

(56) References Cited

U.S. PATENT DOCUMENTS

| | | | |
|---|---|---|---|
| 5,838,965 | A | 11/1998 | Kavanagh et al. |
| 6,782,540 | B1 | 8/2004 | Chow et al. |
| 7,085,739 | B1* | 8/2006 | Winter .................. G06Q 20/40 705/37 |
| 7,805,713 | B2 | 9/2010 | Patel |
| 7,882,155 | B2 | 2/2011 | Meadows |
| 8,656,374 | B2 | 2/2014 | Belyy et al. |
| 8,768,923 | B2 | 7/2014 | Drumm et al. |
| 2002/0188928 | A1 | 12/2002 | Szpak et al. |
| 2003/0204481 | A1 | 10/2003 | Lau |
| 2004/0088158 | A1* | 5/2004 | Sheu ................. G06F 16/24522 704/9 |
| 2006/0200833 | A1 | 9/2006 | Stone et al. |
| 2008/0155500 | A1 | 6/2008 | Richmond |
| 2016/0283512 | A1 | 9/2016 | Farenden et al. |
| 2017/0011135 | A1* | 1/2017 | Srivastava ............ G06F 16/258 |

OTHER PUBLICATIONS

Yan et al.,"Translating Relational Schema With Constraints Into OODB Schema",1993,Elsevier,pp. 17 (Year: 1993).*

Geetha et al., "Automatic Relational Schema Extraction from Natural Language Requirements Specification Text", Middle-East Journal of Scientific Research 21 (3): 525-532, Jan. 2014.

Geetha et al., "Automatic Domain Knowledge Extraction from Requirements Specification Text", Research Journal of Applied Sciences, Engineering and Technology 12(9): 926-932, 2016, submitted: Oct. 9, 2015, Accepted: Oct. 20, 2015; Published: May 5, 2016.

* cited by examiner

ASCII BASED INSTANT OBJECT ORIENTED SCHEMA GENERATION

BACKGROUND

The present invention generally relates to computer databases and particularly to a system and method for developing a relational object-oriented database management system schema directly from high level requirements documents.

BACKGROUND

In any kind of computer-run application, specially involving computer-aided-design, it is often required to generate or develop an Object-Oriented Database Management System Schema (OODBMS) based on the requirement. This OODBMS Schema is required to insulate the users/application using the database (DB) from the data representation and/or data structures that comprise the objects. To develop any database specific object-oriented schema there is first a need to depend on a technical team member(s) of certain skill set who will analyze the requirement and develop the OODBMS specific to the database accordingly.

In current approaches for developing OODBMS from requirements, it is required to follow the system development life cycle (SDLC) and develop the relational database schema from the High-level requirements by: 1. analyzing the high-level requirement, e.g., such as may be gathered by a sales team; 2. preparing Object Relationship Diagrams (ORD) from the requirement gathered by the sales team; 3. identify the Atom Objects once the ORD are developed; and 4. having the developed schema tested and create the relational DB tables for a particular schema.

This process is normally time consuming and effort estimate always depends on findings of the resource with the particular skill set, i.e., technical resource who can develop the ODBMS.

SUMMARY

One embodiment of the present invention is a system, method and computer program product providing a framework that provides the ability to generate instantly a prototype OODBMS schema directly from the requirements document which is gathered in plain English.

Moreover, in one embodiment, the system, method and computer program product is enabled to modify OODBMS schema given a completely separate feature of a Logical Object Oriented Database specific ASCII Interpreter.

According to one embodiment, there is provided a method for generating an ASCII-based, Object-Oriented Database (OODB) schema. The method comprises: receiving a text document indicating one or more requirements of an underlying object-oriented system, and using a processor to identify ASCII-character based sentences in the text; using the processor to parse through identified sentences of the document to identify nouns corresponding to an object, and each noun's attributes; for each identified noun, using the processor to create first key-value data structures mapping each identified object to one or more associated attributes; using the processor to identify from created first key-value data structures, any attributes of an identified object that reference another identified object; for each identified object, using the processor to create a second key-value data structure, each second key-value structure mapping each object attribute identified as an object reference to a corresponding key value identifying the object reference; and generating, using the processor, an OODB schema based on the first key-values data and second key-value data structure mappings.

In a further embodiment, there is provided a computing system comprising a computer processor coupled to a computer-readable memory unit, the memory unit comprising instructions that when executed by the computer processor implements a method comprising: receiving a text document indicating one or more requirements of an underlying object-oriented system, and using a processor to identify ASCII-character based sentences in the text; using the processor to parse through identified sentences of the document to identify nouns corresponding to an object, and each noun's attributes; for each identified noun, using the processor to create first key-value data structures mapping each identified object to one or more associated attributes; using the processor to identify from created first key-value data structures, any attributes of an identified object that reference another identified object; for each identified object, using the processor to create a second key-value data structure, each second key-value structure mapping each object attribute identified as an object reference to a corresponding key value identifying the object reference; and generating, using the processor, an OODB schema based on the first key-values data and second key-value data structure mappings.

In a further aspect, there is provided computer program products for performing operations. The computer program products include a storage medium readable by a processing circuit of an electronic device and storing instructions run by the processing circuit for running a method. The method is the same as listed above.

BRIEF DESCRIPTION OF THE DRAWINGS

Objects, features, and advantages of the present disclosure will become more clearly apparent when the following description is taken in conjunction with the accompanying drawings, in which.

DETAILED DESCRIPTION

A computer-implemented system, method and computer program products for automatically generating an object-oriented relational database schema based directly from a textual requirements document.

As described herein, an object oriented database "schema" refers to an organization of data in an object oriented database, or OODBMS (Object Oriented Database Management System) which is a database that stores objects.

As known, an object includes data having a structure or state (e.g., variables) and methods (i.e., behavior/operations). When queried according to an object-oriented (O-O) query language, these databases return the objects in their entirety, which means a returned object's attributes and methods are as usable as they were before the object was ever stored in the database.

As referred to herein, an O-O database schema can include a set of formulas (sentences) called integrity constraints that are imposed on a database. When designing an O-O database, a schema is specified that describes the structural view of a database including the objects that would be involved, the attributes for the objects and their associations (relationships).

Figure 1:
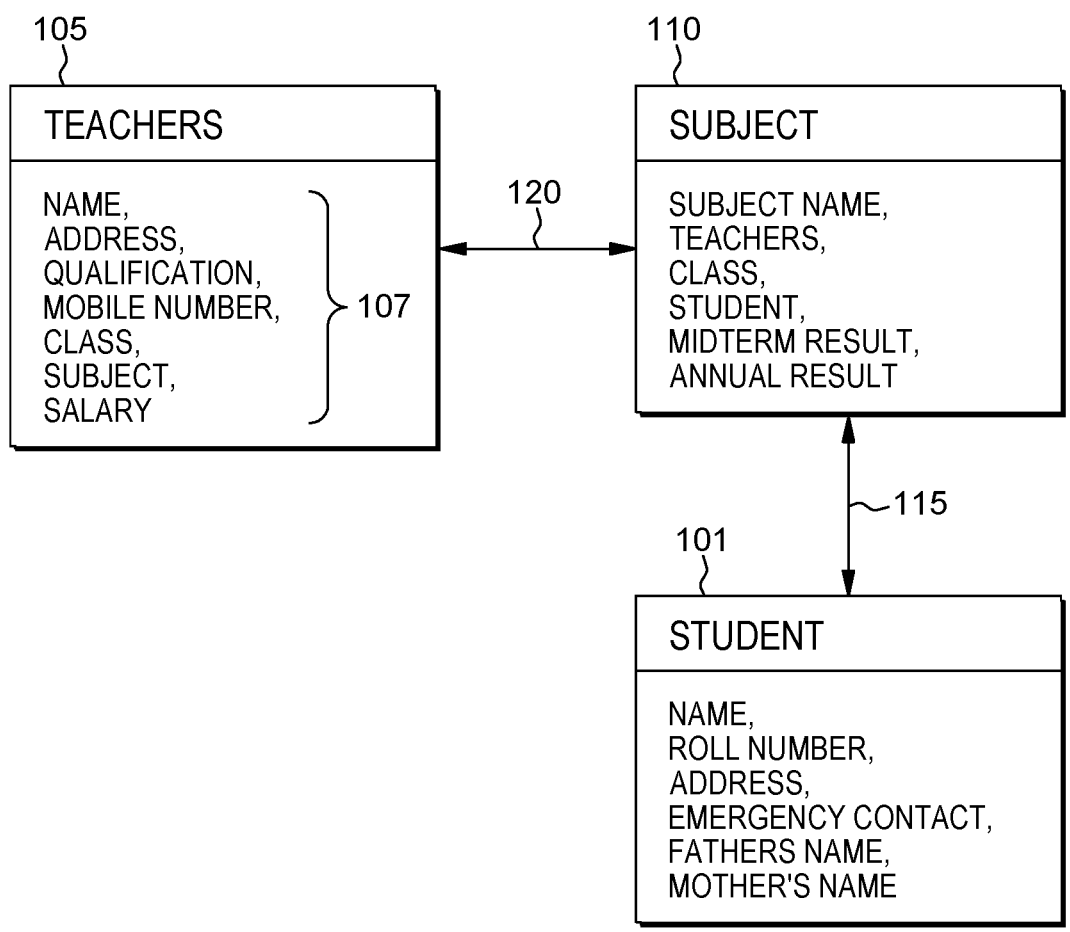
FIG. 1 depicts an example simplistic object-oriented database schema generated in accordance with one embodiment.

FIG. 1 conceptually depicts an example of a simple object-oriented database (OODB) schema 100 showing an example relationship or mapping among class objects such as students 101, teachers 105 and courses (subjects) 110. In FIG. 1 each class object includes attribute data defining a property or state of an object. For example, teachers object 105 includes attribute properties 107 including, e.g., name, address, qualification, mobile number, class, subject, salary, etc. Although not shown, each attribute property will have an associated value, e an atomic or structured literal. As shown the example OODB schema 100 further depicts relationships (e.g., object instance connections) among the objects, e.g., a relationship 115 between a student 101 and the subject 110 that student is enrolled in, and a relationship 120 between a teacher 105 and the subject 110 that teacher instructs. For example, the instance connection 115 shows a double-headed arrow indicating a bi-directional relationship that many students may be enrolled in a single subject 110 or that one student may be enrolled in many subjects. The example instance connection 120 shows a single arrow representing a unidirectional relationship that a single teacher may teach multiple subjects 110.

In embodiment, a computer-implemented system automatically generates an object-oriented relational database schema based directly from a textual requirements document.

The present invention implements an OODB based dictionary based ASCII Interpreter module for analyzing American Standard Code for Information Interchange (ASCII) codes that represent a text version of the captured requirement by a software database "requirements" gathering team, and generating the meta data for each individual Object as a key-value pair. The system implements a Logical Atomic Object (AO) Identifier that processes this key value pair to identify the encapsulation of object as well as to generate the schema.

Using the system and methods herein, any object-oriented database schema no matter how complex it is, can be generated instantly from the requirements directly which are captured by requirement gathering team and in a manner that is not dependent upon any technical team with specific competencies for any kind of applications.

Figure 2:
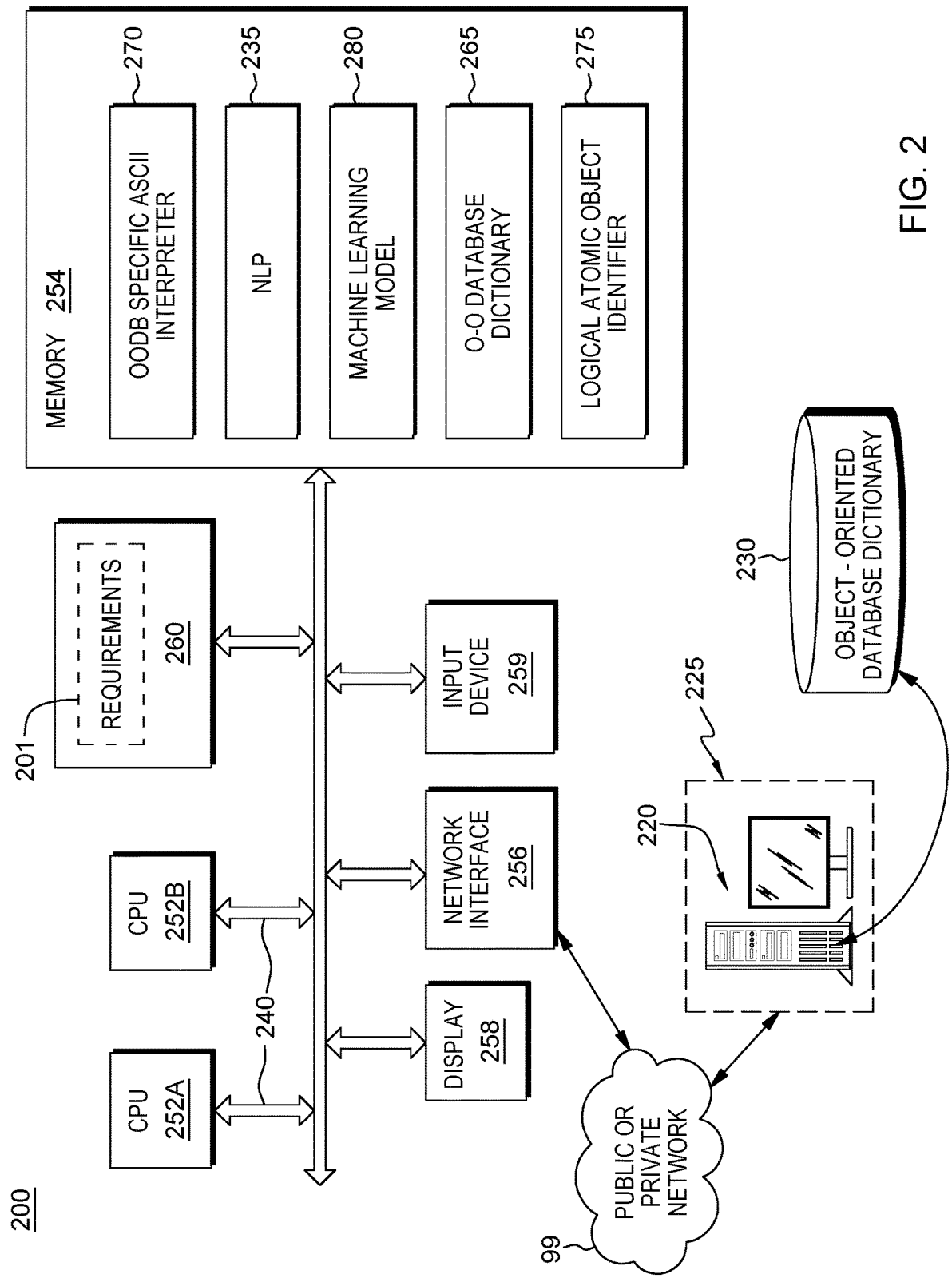
FIG. 2 depicts a computer system providing the ability for automatically generating an object-oriented database schema according to one embodiment.

FIG. 2 depicts a computer system providing the ability for automatically generating an ASCII-based object-oriented database schema according to one embodiment. In some aspects, system 200 may include a computing device, a mobile device, or a server. In some aspects, computing device 200 may include, for example, personal computers, laptops, tablets, smart devices, smart phones, or any other similar computing device.

Computing system 200 includes one or more hardware processors 252A, 252B, a memory 254, e.g., for storing an operating system and program instructions, a network interface 256, a display device 258, an input device 259, and any other features common to a computing device. In some aspects, computing system 200 may, for example, be any computing device that is configured to communicate with a web-site 225 or web- or cloud-based server 220 over a public or private communications network 99. Further, as shown as part of system 200, data such as a textual "requirements" document 201 having sentences and/or text that captures a specification of the requirements for designing/updating a new object-oriented database may stored locally in an attached memory storage device 260, e.g., a clipboard memory, or stored in an attached, or a remote memory storage device 230, e.g., a database, and accessed via a remote network connection for input to the system 200.

In the embodiment depicted in FIG. 2, processors 252A, 252B may include, for example, a microcontroller, Field Programmable Gate Array (FPGA), or any other processor that is configured to perform various operations. Additionally shown are the communication channels 240, e.g., wired connections such as data bus lines, address bus lines, Input/Output (I/O) data lines, etc., for routing signals between the various components of system 200. Processors 252A, 252B may be configured to execute method instructions as described below. These instructions may be stored, for example, as programmed modules in memory storage device 254.

Memory 254 may include, for example, non-transitory computer readable media in the form of volatile memory, such as random access memory (RAM) and/or cache memory or others. Memory 254 may include, for example, other removable/non-removable, volatile/non-volatile storage media. By way of non-limiting examples only, memory 254 may include a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing.

Network interface 256 is configured to transmit and receive data or information to and from a web-site server 220, e.g., via wired or wireless connections. For example, network interface 256 may utilize wireless technologies and communication protocols such as Bluetooth®, WIFI (e.g., 802.11a/b/g/n), cellular networks (e.g., CDMA, GSM, M2M, and 3G/4G/4G LTE), near-field communications systems, satellite communications, via a local area network (LAN), via a wide area network (WAN), or any other form of communication that allows computing device 200 to transmit information to or receive information from the server 220.

Display 258 may include, for example, a computer monitor, television, smart television, a display screen integrated into a personal computing device such as, for example, laptops, smart phones, smart watches, virtual reality headsets, smart wearable devices, or any other mechanism for displaying information to a user. In some aspects, display 258 may include a liquid crystal display (LCD), an e-paper/e-ink display, an organic LED (OLED) display, or other similar display technologies. In some aspects, display 258 may be touch-sensitive and may also function as an input device.

Input device 259 may include, for example, a keyboard, a mouse, a touch-sensitive display, a keypad, a microphone, or other similar input devices or any other input devices that may be used alone or together to provide a user with the capability to interact with the computing device 200.

With respect to the ability of computer system 200 for generating ASCII-based object-oriented DB schema, the local or remote memory 230 may be configured for storing an ASCII-based object oriented data dictionary that stores objects and nouns that, in embodiments herein, are continually revised and updated with new objects (nouns) as new requirements are specified for schema generation. The ASCII-based object-oriented dictionary (or portions thereof) may alternately be stored in memory 260 local to the computer device system 200, or otherwise, embodied in a database 230 associated with the remote server 220, over a network.

As mentioned, memory 254 of computer system 200 further stores processing modules that include programmed instructions adapted to invoke operations for analyzing textual requirements document and automatically generating ASCII-based object-oriented schema representation.

In one embodiment, one of the programmed processing modules stored at the associated server memory 254 include a logical OODB specific ASCII Interpreter module 270 providing instructions that, when run by a processor, configures the system to interpret the requirements sentences to obtain "Objects" (e.g., nouns) and identify their attributes and references for storage as Key-value pairs. In particular, steps are implemented for identifying inter-object relationships and storing them in pairs and for generating an object map (OM) including objects and attribute key value pairs. Interpreter 270 also runs steps for identifying the Inter-Object relationships and also storing them in pairs and for generating an object reference (OR) mapping. The OM and OR maps are used as the basis for generating the object schema instantly based on plain simple text which may be in any language.

A further programmed processing module includes a natural language processor module that invokes a (natural language) text parser 235 for parsing an input flat file in simple text as prepared by a requirements gathering team, and retrieving all the ASCII characters present in that object-oriented requirements file. In an embodiment, the input flat file is text in any language.

A further programmed processing module stored at the associated server memory 254 include a Logical Atomic Object (AO) Identifier module 275 providing instructions that, when run by a processor, configures the system to identify encapsulation levels of objects and generate the object-oriented schema based on the OM and OR Maps formed by the logical OODB specific ASCII Interpreter 270. AO Identifier module 275 compares the Object Attribute Map (OM) with the Object Reference Map (OR) to find out the Object which does not have any reference in the entire Object Map generated by the interpreter module. It then identifies it as an "Atomic" object of the OODBMS model, the atomic object having only a basic value(s) such as an integer, a real, Boolean or string values. Once the Atom Object is identified, it then compares all the objects in the Object Attribute Map to understand the encapsulation level of each based on the Atom Object. After that, AO Identifier module 275 uses the Object details (OM) map, Object attributes (OM) map, Object references (OR) map and encapsulation degree of each object. Finally using all these (OM) and (OR) mapping information, the same module generates the schema for the Object-Oriented Database.

In one embodiment, one of the programmed processing modules stored at the associated server memory 254 include a Machine Learning Module 280 that runs as a slave process for the a logical OODB specific ASCII Interpreter 270 and The Logical Atomic Object Identifier 275 components. This machine learned model, when run by a processor at system 200, configures the system to invoke operations and provide application program interfaces for capturing any error occurring in any of the components and storing it against the Object captured from the run time. It then stores the Object and the exception data in a key to feed it into the Object-oriented DB Specific ASCII Dictionary 230. In this way, the machine learning module renders the dictionary to be more accurate.

Figure 3:
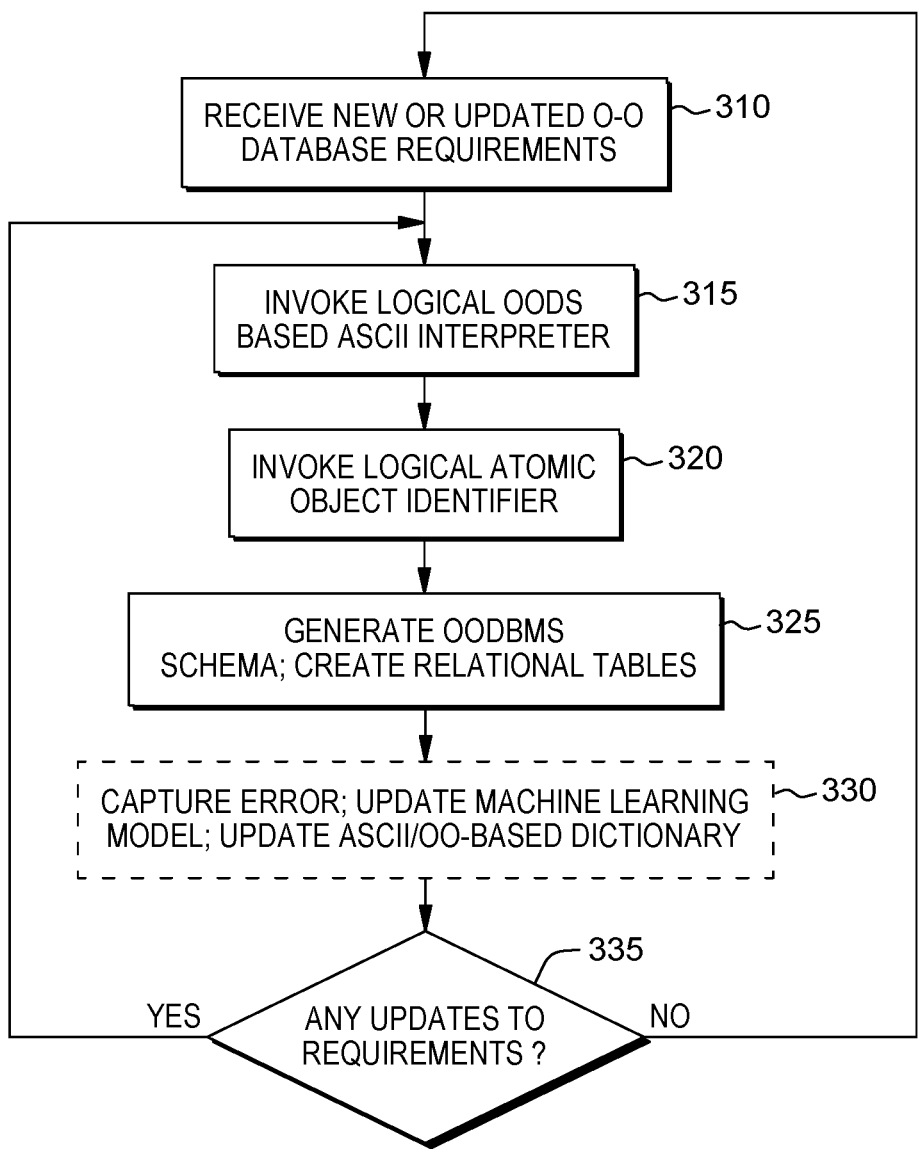
FIG. 3 depicts an iterative method for automatically generating an object-oriented database schema according to one embodiment.

FIG. 3 depicts an overview of an iterative method 300 for automatically generating an object-oriented database schema according to one embodiment.

As shown in FIG. 3, at 310, the system receives the database "requirements" gathered from a requirements team which requirements can be input as a text file (e.g., a flat text digital file stored in memory) with sentences of ASCII-based characters. Then, at 315, a logical O-O database ASCII interpreter invokes methods to navigate through the text file and identify from the text file the objects. At this point, the system generates, by the ASCII interpreter, meta data for each individual Object as a key-value pair.

At 320, further methods are invoked to identify the existence of atom objects and other object-oriented database management system (OODBMS) items required to identify the encapsulation of the OODBMS requirements. That is, using an atom object identifier and the key value pair enables identifying the encapsulation of object for generating the schema.

Based on the object key-values, atomic objects and other OODBMS items, the methods generate the OODBMS schema at 325 and in one embodiment, create any relational tables for the particular schema. The resulting database is such that it is managed by an object-oriented database management system or any database management system (DBMS) that stores data in a logical model that is closely aligned with an object model of an application program.

Continuing to 330, there can be optionally performed steps for update machine learning model that can be used to update an ASCII-based OODBMS data dictionary used in identifying nouns from ASCII character combinations extracted from the sentences in the requirements file. For example, the machine learning techniques capture any errors in identifying nouns and use errors to train a model to increase accuracy of identifying nouns by the data dictionary.

The methods permit end users to navigate iteratively through the generated schema and provide updates in the schema by updating the requirement file, without the need of technical team members. Thus, continuing at 335, a decision may be periodically made as to whether there are any updates to the requirements, e.g., from the requirements team that specified the requirements in the text file. If there are current updates to the generated requirements file, the method will flag the update and return to and repeat steps 315, 320, 325 in order to update the schema; otherwise the process may end or subsequently return to 310 when new updates to the OODBMS are received.

Figure 4:
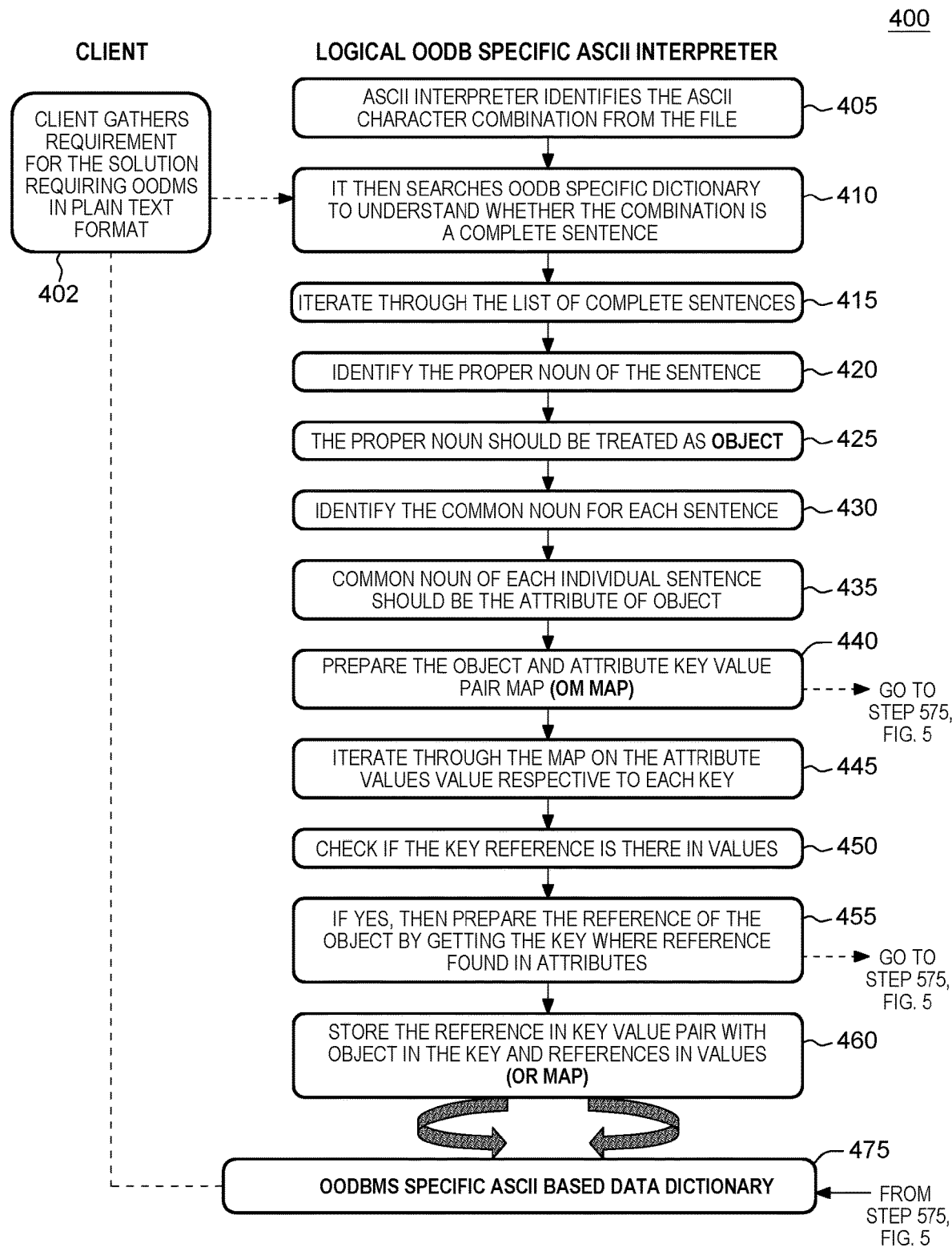
FIG. 4 depicts a method run by the logical OODB specific ASCII Interpreter to invoke operations for interpreting a requirements text document.

FIG. 4 depicts a method 400 run by the logical OODB specific ASCII Interpreter 270 to invoke operations for interpreting a requirements text document.

As shown in FIG. 4, at 402, the system 200 client application gathers or accesses from memory requirements for the solution requiring OODMS in a plain text flat file format. Requirements for OODBMS schema generation may be in a digital form of ASCII character-based text sentences in any language as prepared by a requirements gathering team. At 405, the ASCII interpreter module 270 parses the received requirements flat file document and identify from the plain text file a sentence of ASCII character combinations. In one embodiment, interpreter module invoke application program interfaces to control the (natural language) text processor module 235 to perform parsing operations of the input requirements flat file document. The ASCII interpreter module 270 retrieves all the ASCII characters present in that requirements file and implements logic to obtain ASCII character combinations.

Then, at 410, the ASCII interpreter then searches OODB Specific Dictionary to determine whether specific combinations of ASCII characters form words of a complete sentence. After running 410, all of the sentences of the requirements file gathered by the requirements team are identified.

Then, by iterating through the list of complete sentences beginning at 415, the interpreter module 270 parses a complete sentence to identify presence of nouns. In particular, processes are implemented to iterate over the ASCII characters combination for each sentence and obtain the ASCII character combination for each word. Then the ASCII combination of the word is compared with words in a built-in Object-oriented Specific Database Specific (OODBMS) ASCII data dictionary which is invoked at 475 by the ASCII interpreter to identify where any word of any sentence is a proper noun, a common noun (e.g., a noun common to more than one identified sentence), or a verb (a responsibility of a noun). As known, the ASCII based (ODBMS) data dictionary 475 includes multiple models of nouns and can be used to interpret the structure and format of ASCII text sentence and define the field names, their order, their data type (string or numeric) and the byte positions they occupy in the sentence. At 420, for the current sentence, the ASCII interpreter automatically identifies the proper noun of the sentence. If a proper noun is found, then at 425 the proper noun is treated as an "Object." At 430, for each sentence, there is further determined whether a current proper noun is a noun common to each sentence. If it is a noun common to each individual sentence, at 435, it is identified as an attribute of the Object. Then, at 440, for the current sentence, the ASCII interpreter stores the Object and attribute as a value in key value pair, for example, <Object ID #-Attribute_1>
<Object ID #-Attribute_2>
...
<Object ID #-Attribute_N> where Object ID # represents a single Object, and corresponding object attributes are Attribute_1, . . . Attribute_N. An example key-value pair for the OM Map can be <Student-name, roll number> or <Teachers-subject>, etc. All key-value pairs for all objects are recorded as an OM Map (Object map) where a key representing the proper noun Object is assigned an associated Object ID. In one embodiment, the OM maps the common nouns and attributes as Object-attribute key-value pairs and an Object Identifier (ID) can be used as a key index when accessing the OM Map.

In one embodiment, a hash tag provided in the requirements text data, provides an ability to customize the requirement by overriding a default rule set. For example, based on a hash tag found in a text requirement, a "hint" can be provided as to what is the atom Object or what will be the Objects for the OODBMS. Thus, the system invokes operations to check for and identify hash tags in the requirements text to change the default. Any word after a hash tag found in the requirements text may be immediately identified as an object or atom object.

Figure 5:
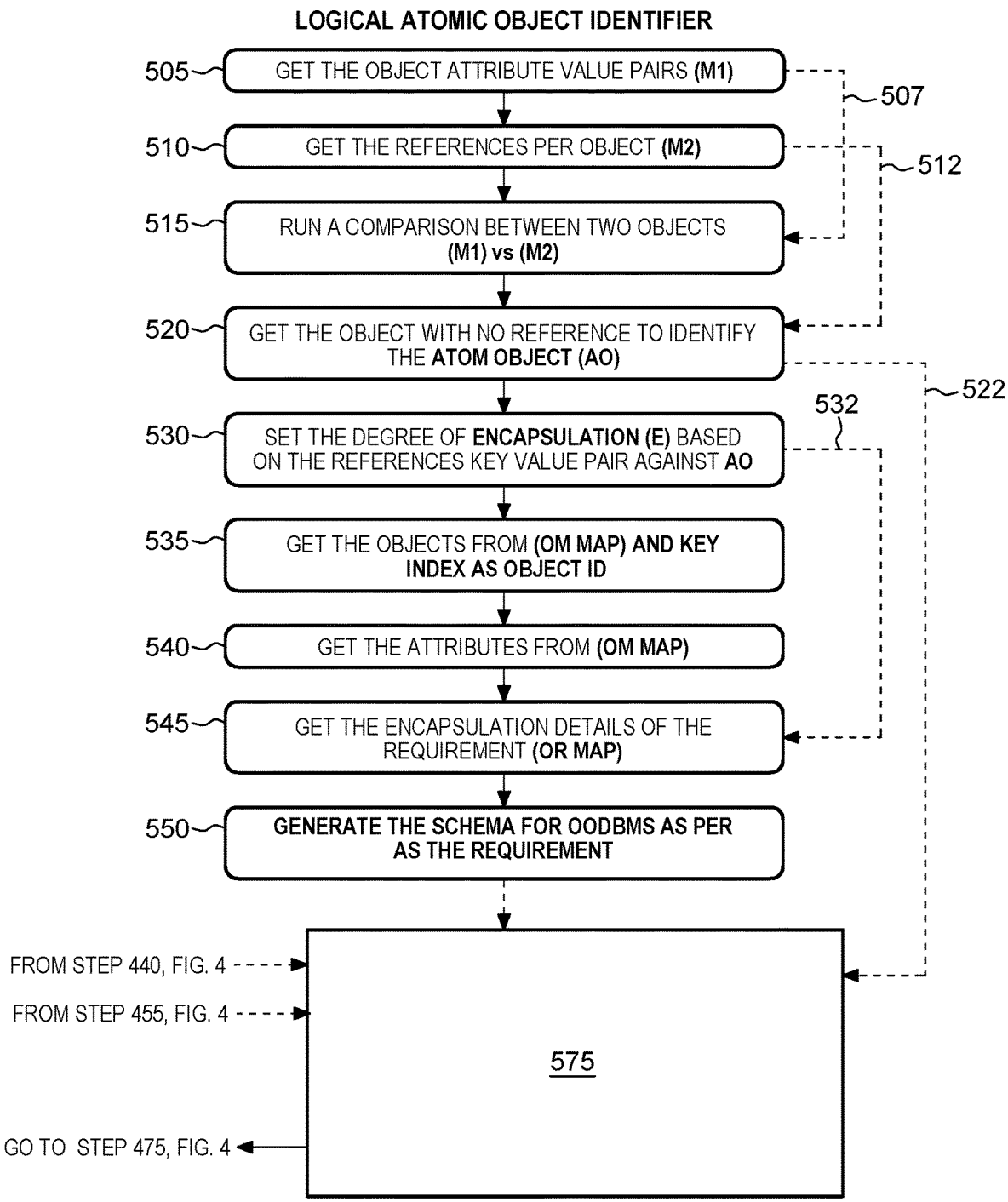
FIG. 5 depicts an embodiment of a method run by the logical Atomic Object Identifier module to invoke operations that drive the encapsulation identification and OODBMS schema generation.

Further, at 440, FIG. 4, parallel processes may be invoked at step 575, FIG. 5 in order to determine if there were any errors in identifying an object or its attribute which may be used to train a machine learned model and used to update the OODBMS ASCII based data dictionary. One embodiment of a method for updating the ASCII based data dictionary is described with respect to FIG. 7.

Continuing at 445, FIG. 4, the OODB-specific ASCII interpreter module 270 iterates through the OM map on the attribute values respective to each key (e.g., OBJECT id), and at 450 performs a check if a key reference is present as an attribute value, i.e., whether an identified object's attribute value refers to (or links to) another identified object. If it is determined that the key reference is an attribute value, then at 455 the system prepares the reference of the Object by getting the key where the reference is found as an attribute. Further, at 455, FIG. 4, parallel processes can be invoked at step 575, FIG. 5 in order to determine if there were any errors in identifying an object or attribute which may be used to update the OODBMS ASCII based data dictionary. Continuing at 460, FIG. 4, the method stores the reference(s) in key value pair with Object in the key and references in values in an Object-Reference (OR) Map. An example OR MAP key-values pair may be <Object ID #-reference hierarchy (encapsulation level)>. An atomic object has no encapsulation.

In one embodiment, by iterating through the OM map using Object ID enables the interpreter 270 to find the reference of the objects in the values of the OM Map to form an Object Reference Map (OR Map) containing the Object as key and references (to the object) as values.

The OM map and OR key-value pairs function as respective inputs to a further programmed Logical Atomic Object Identifier module 275 for determining presence of atomic object and encapsulation levels or object hierarchy as described with reference to FIG. 5.

FIG. 5 depicts an embodiment of a method 500 run by the Logical Atomic Object Identifier module 275 to provide application program interfaces and invoke operations that drive the encapsulation identification and schema generation based on the OM and OR Maps formed by the logical OODB specific ASCII Interpreter.

As shown in FIG. 5, step 505, the system 200 invokes operations to obtain the Object-attribute key value pairs (M1) from the OM map. An object_ID is used as a key index into the OM Map to obtain attributes. The attributes from key value pairs (M1) are forwarded via step 507 for subsequent comparison with object references at step 515. Continuing at 510, for each object, operations are invoked to obtain from the OR Map the references per object (M2). If at 510, it is determined, for a current key-value pair (M1) that there are no reference values to a particular object in the OR Map, the method proceeds via step 512 to step 520, where the system identifies that object as an Atom Object (AO) of the OODBMS model. At this point, at 522, FIG. 5, parallel processes may be invoked at step 575, FIG. 5 in order to determine if there were any errors in identifying the atom object which may be used to update the OODBMS ASCII based data dictionary. Otherwise, the method continues to step 515 wherein operations are invoked to compare the object of a current object-attribute key value pair (M1) against the references per object (M2).

If the current object (M1) is not an atomic object, then continuing at 530, FIG. 5, operations are run to set the degree of encapsulation (E) based on the references key value pair against the identified atom object. Via step 532, the process can continue to 545 in order to get the encapsulation details of the requirement (from the OR map) based on the references values pointing to other objects. Then, at 535, operations are invoked to obtain the Object details and Object attributes from the (OM Map) and the key index as Object Id. Then, at 540, methods are invoked to obtain the attributes from (OM Map). Then, at 545, the system invokes operations to obtain the encapsulation degree of each object of the requirement (OR Map). Then at 550, the system generates the Object-Oriented Database Schema for OODBMS based on the plain text requirement.

After generating the OODBMS schema at 550 using the OM map objects, attributes and encapsulation details of the object from OR map, and identified atom objects, at 575, FIG. 5 further processes may be invoked to determine whether any errors were determined which may be used to update the OODBMS ASCII based data dictionary.

Figure 7:
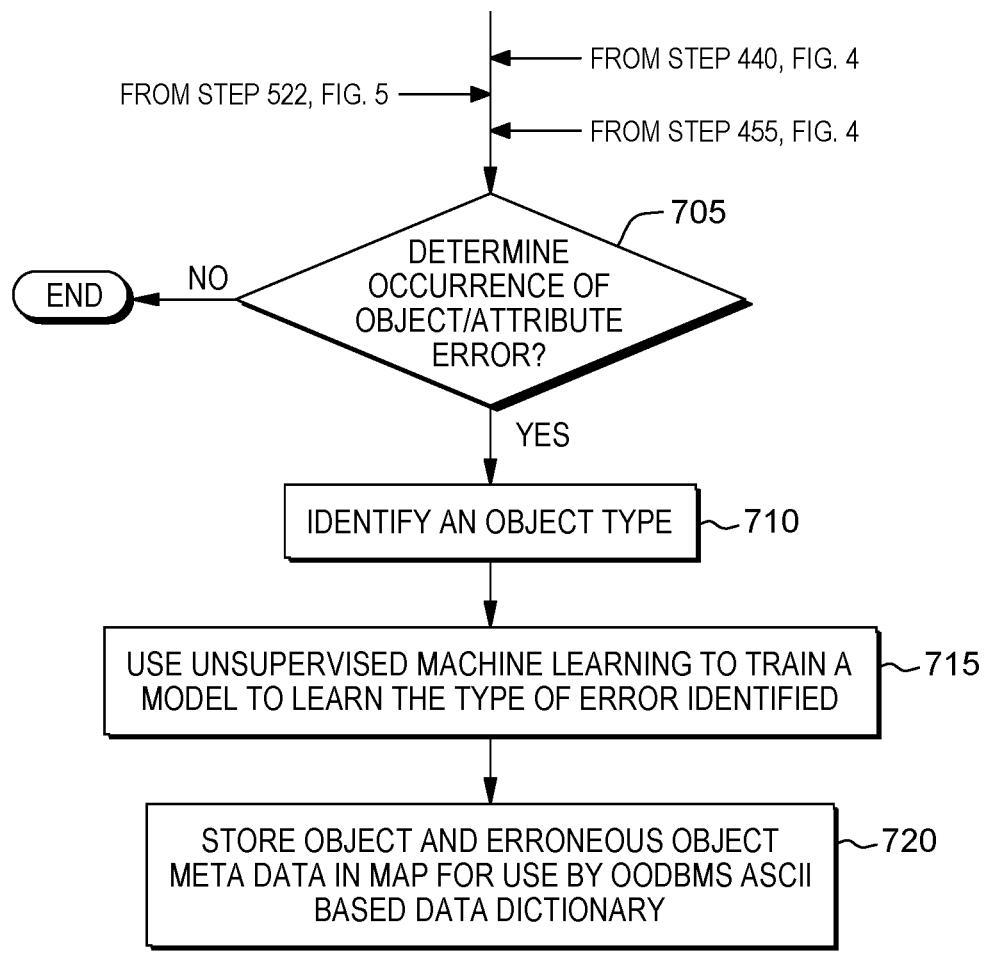
FIG. 7 shows an example method for updating the OODBMS ASCII database data dictionary in one embodiment.

FIG. 7 shows an example method 700 for updating the OODBMS ASCII database data dictionary as performed at step 575, FIG. 5. This process may be run in parallel to the interpreter and/or atomic object identifying processes of FIGS. 4 and 5, or values may be stored and subsequently processed off-line. In one embodiment, method 700 invokes operational steps at 705 for identifying from a current object and attribute pair whether an error has occurred in the object being processed in the interpreter and/or logic atomic object identifying processes. For example, one error that can occur includes misidentifying Objects from combinations of ASCII characters in the requirements. If there is no error, the interpreter or logic AO identifier program proceeds and no action is taken. If there is an error, a step 710 determines the object type, and at 715, invokes unsupervised machine model to train the model to learn the type of error identified based on that identified object type and meta data. For example, an un-supervised machine learning technique is implemented to build a machine learned model for correlating errors in identifying Objects from requirements combinations of ASCII characters. At 720, FIG. 7, by identifying the object type, the object along with erroneous object metadata in the map can be stored and used for updating the ASCII based data dictionary to increase its accuracy.

As an illustrative example case study of the methods herein, a sample requirements file is provided with textual sentences as an input. The system of FIG. 2 and methods of FIGS. 4 and 5 generate an output sample requirements file in the form of a relational DB schema component. The case study is a scenario of an organization of an educational institution.

The sentences of the example requirements file include:
1) School have set of name, classes, teachers, students, non-teaching staff.
2) Classes have set of teachers, students, subjects;
3) Students have set of name, roll number, address, emergency contact, father's name, mother's name;
4) Subjects have subject name, teachers, class, student, midterm result, annual result;
5) Teachers have set of name, address, qualification, mobile number, class, subject, salary; and
6) Non-Teaching staff have set of name, qualification, mobile no, address, salary.

The system and methods of FIGS. 4 and 5 will automatically generate an output sample requirements file in the form of an object-oriented relational DB schema components as follows:

In the following example output, "OR" refers to an Object Reference. Encapsulation levels range from −1, 0, 1, 2 . . . etc. and represent the amount of references to other objects which are parenthetically indicated as an OR reference to another Object ID:

Object Name: Students
    Attributes: name, roll number, address, emergency contact, fathers name, mother's name
    Encapsulation Level: −1 (Atom Object)
    Object ID: 3
Object name: Subjects
    Attributes: subject name, teachers (OR to object id 5), class, student, midterm result, annual result.
    Encapsulation Level: 0 (Atom Object)
    Object ID: 4
Object name: Teachers
    Attributes: name, address, qualification, mobile number, class, subject (OR to object id 4), salary
    Encapsulation Level: 0 (Atom Object)
    Object ID: 5
Object name: Non-Teaching
    Attributes: set of name, qualification, mobile no, address, salary
    Encapsulation Level: −1 (Atom object)
    Object ID: 6
Object name: Classes
    Attributes: set of class, teachers (OR to object id 5), students (OR to object id 3), subjects (OR to object id 4),
    Encapsulation Level: 2
    Object ID: 2
Object name: School
    Attributes: set of class name, classes (OR to object id 2), teachers (OR to object id 5), students (OR to object id 3), non-teaching staff (OR to object id 6).
    Encapsulation Level: 3
    Object ID: 1

Figure 6:
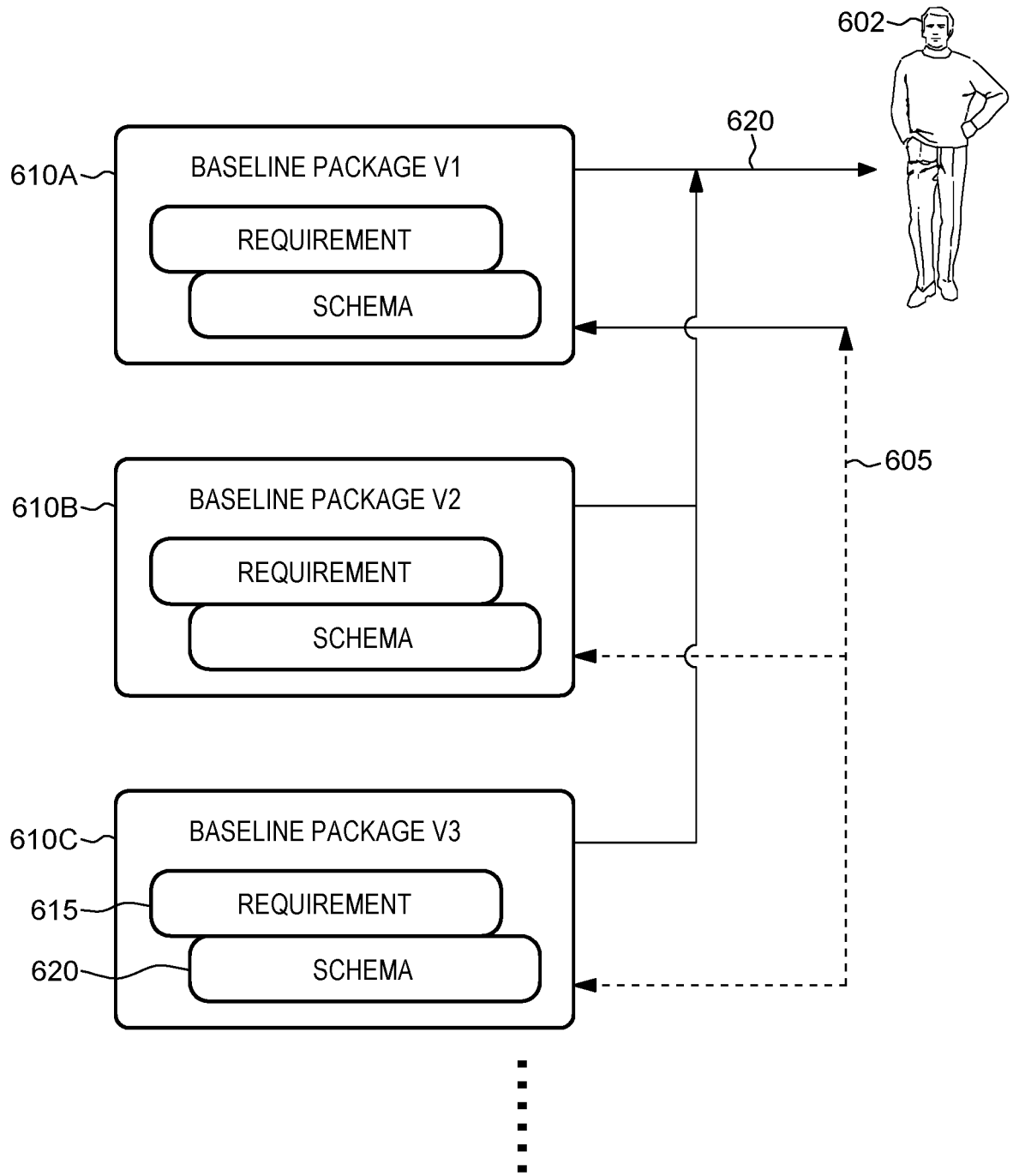
FIG. 6 illustrates a history tracking feature in one embodiment, wherein a user can "base line" the requirements along with the generated schema.

FIG. 6 illustrates a history tracking feature in one embodiment, wherein a user can "base line" the requirements along with the generated schema. For example, there may be create a versioning of the requirements and generated OODBM schema. Thus, subsequently, a client or the initial sales team can update a new feature, generate the schema again test and then baseline the package as an updated version. This feature helps to track the history of changes in the requirements specified by client or by sales team under direction from client.

In FIG. 6, an iterative updating of the schema 600 is performed for use in updating an object-oriented database management system when new or updated requirements are received at 605. In an example, updated requirements may continue to be received until all business requirements are met. In FIG. 6, a client or a sales team entity 602 can navigate through the generated schema and do any update in the schema by simply updating the requirement file.

At each iterative update of the requirements document text, the system creates a new baseline package version, each including the added requirements and the updated schema automatically generated. For instance, the system generates and tracks history of created baseline packages, e.g., 610A, 610B, 610C, etc. including a corresponding updated schema 620 for each new corresponding requirement 615 received at each iteration. In an embodiment, client entity 602 via an interface to computer system 200, can update a feature in the Requirements textual flat file and the system invoked to create a new baseline package version including an updated ASCII-based object-oriented database schema 620 generated using the methods herein for use in updating an object-oriented database model used in a OODBMS.

The systems and methods herein can be used with any type of OODMBS platforms available implementing a number of known APIs and query languages to use with them. In one embodiment, a Java Data Objects (JDO) API may be used to store Java objects into an object database based on an OODBMS schema generated in accordance with the embodiment of the invention.

The system and method provides logic for generating instantly and directly from the requirements document text (i.e., text captured by requirement gathering team) any object-oriented database schema at any degree of complexity.

The system and method avoids any dependency to any technical team with specific competencies for any kind of applications. All that is required is the OODB based dictionary based ASCII Interpreter to analyze the ASCII of the captured requirement by requirements gathering team.

In a further embodiment, the system and method further enables the generation of an OODBMS database utilizing the generated ASCII-based, object-oriented schema generated according to the embodiments herein.

Figure 8:
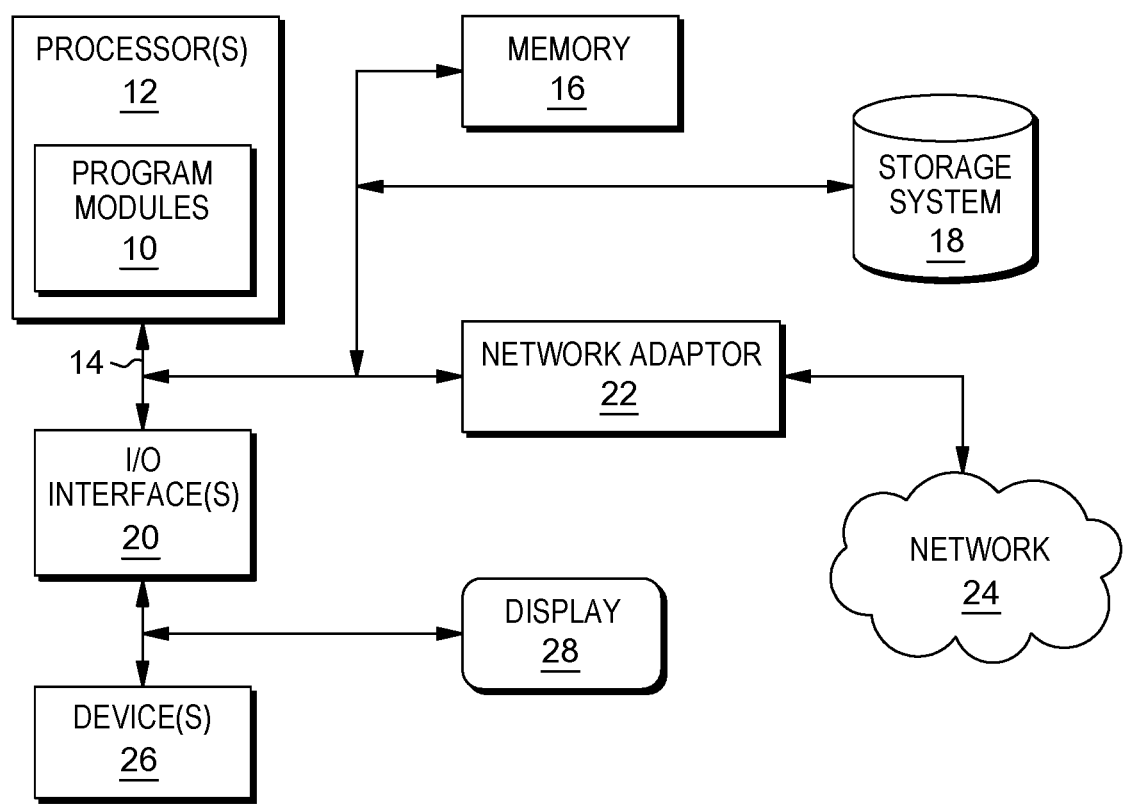
FIG. 8 depicts an exemplary system in accordance with embodiments of the present invention.

FIG. 8 illustrates an example computing system in accordance with the present invention that may provide the services and functions associated with automatically generating object-oriented relational database schema. It is to be understood that the computer system depicted is only one example of a suitable processing system and is not intended to suggest any limitation as to the scope of use or functionality of embodiments of the present invention. For example, the system shown may be operational with numerous other general-purpose or special-purpose computing system environments or configurations. Examples of well-known computing systems, environments, and/or configurations that may be suitable for use with the system shown in FIG. 2 may include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

In some embodiments, the computer system may be described in the general context of computer system executable instructions, embodied as program modules stored in memory 16, being executed by the computer system. Generally, program modules may include routines, programs, objects, components, logic, data structures, and so on that perform particular tasks and/or implement particular input data and/or data types in accordance with the methods described in FIGS. 3-5.

The components of the computer system may include, but are not limited to, one or more processors or processing units 12, a memory 16, and a bus 14 that operably couples various system components, including memory 16 to processor 12. In some embodiments, the processor 12 may execute one or more modules 10 that are loaded from memory 16, where the program module(s) embody software (program instructions) that cause the processor to perform one or more method embodiments of the present invention. In some embodiments, module 10 may be programmed into the integrated circuits of the processor 12, loaded from memory 16, storage device 18, network 24 and/or combinations thereof.

Bus 14 may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

The computer system may include a variety of computer system readable media. Such media may be any available media that is accessible by computer system, and it may include both volatile and non-volatile media, removable and non-removable media.

Memory 16 (sometimes referred to as system memory) can include computer readable media in the form of volatile memory, such as random access memory (RAM), cache memory and/or other forms. Computer system may further include other removable/non-removable, volatile/non-volatile computer system storage media. By way of example only, storage system 18 can be provided for reading from and writing to a non-removable, non-volatile magnetic media (e.g., a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 14 by one or more data media interfaces.

The computer system may also communicate with one or more external devices 26 such as a keyboard, a pointing device, a display 28, etc.; one or more devices that enable a user to interact with the computer system; and/or any devices (e.g., network card, modem, etc.) that enable the computer system to communicate with one or more other computing devices. Such communication can occur via Input/Output (I/O) interfaces 20.

Still yet, the computer system can communicate with one or more networks 24 such as a local area network (LAN), a general wide area network (WAN), and/or a public network (e.g., the Internet) via network adapter 22. As depicted, network adapter 22 communicates with the other components of computer system via bus 14. It should be understood that although not shown, other hardware and/or software components could be used in conjunction with the computer system. Examples include, but are not limited to: microcode, device drivers, redundant processing units, external disk drive arrays, RAID systems, tape drives, and data archival storage systems, etc.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowcharts and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. The corresponding structures, materials, acts, and equivalents of all elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method for generating an ASCII-based, Object-Oriented Database (OODB) schema comprising:
    receiving a text document indicating one or more requirements of an underlying object-oriented system, and using a processor to identify ASCII-character based sentences in said text;
    using a processor to parse through identified sentences of the document to identify nouns, each identified noun corresponding to an object, and identify one or more attributes associated with each corresponding object;
    using the processor to create first key-value data structures mapping each corresponding object to its identified one or more associated attributes;
    using the processor to identify from created first key-value data structures any associated attributes of a corresponding object that reference another object;
    for each corresponding object, using the processor to create a second key-value data structure, each second key-value structure mapping each corresponding object's attribute identified as an object reference to a corresponding key value identifying the another object being referred;
    obtaining, using the processor, a first key-value data structure of an object;
    obtaining, using the processor, identified object references for an object from said second key-value data structure;
    comparing, using the processor, the obtained first key-value data structures against each identified object reference;
    identifying, using the processor, an object having no reference as an atom object;
    setting, using the processor, a degree of encapsulation of the object based on the references key-value pair against the identified atom object; and
    generating, using said processor, an OODB schema based on the first key-values data and second key-value data structure mappings, the identified atom object, and the encapsulation degree of the objects of second key-value data structure mappings.

2. The method of claim 1, wherein said text characters are ASCII characters, said identifying a noun further comprising:
    using the processor to parse through identified sentences of the document and identify combinations of text characters;
    iterating, using the processor, over the ASCII characters combination for each sentence to obtain the ASCII character combination of a word;
    comparing, using the processor, the ASCII combination of the word against words in an object-oriented specific ASCII data dictionary;
    identifying, using the processor, any word of any sentence is a proper noun or a responsibility of a noun.

3. The method as claimed in claim 1, wherein said creating said second key-value data structures comprises:
    using the processor to iterate through the created first key-value data structures mapping each corresponding object to one or more associated attributes; and
    for a current object, checking, using the processor, if identified current object's attribute value links to another object; and
    upon determining of a linkage to said another object, obtaining a key where the reference is found as an attribute; and
    storing said reference in the second key-value data structure with the object as the key and object references as its values.

4. The method as claimed in claim 1, further comprising:
    obtaining from said second key-value data structures, using the processor, a level of encapsulation of the requirement from the references values linking to other objects, said processor generating said OODB schema by further using said identified atomic object, said encapsulation degree and said encapsulation level of said requirement.

5. The method as claimed in claim 1, wherein said requirements text document includes a hashtag link, said method further comprising:
    using said processor to identify from said text document said hashtag link; and
    interpreting said hashtag link as one of an object for said generated OODB schema or an atom object.

6. The method as claimed in claim 2, further comprising:
    detecting, using said processor, an erroneous identification of an object and/or an object's erroneous metadata;
    training a machine learned model to learn an error based on said erroneous identified object and/or its meta data; and
    updating a word representing said object in said object-oriented specific ASCII data dictionary to include said erroneous identified object and/or meta data error.

7. The method as claimed in claim 2, further comprising:
    detecting, using said processor, occurrence of a requirements text update being added to said text document;
    using said processor to process said requirements text update to identify an object and any object attributes, create a further first key-value data structure mapping the identified object to one or more associated attributes, create a further second key-value data structure to map any object attribute identified as an object reference to another object with a corresponding key value identifying the object reference; and
    updating said OODB schema based on said created further first key-value data and second key-value structures.

8. A computer program product being tangibly stored on a non-transitory computer readable storage medium and comprising machine-executable instructions, the instructions, when executed on an electronic device, causing the electronic device to:
    receive a text document indicating one or more requirements of an underlying object-oriented system;
    identify ASCII-character based sentences in said text;
    parse through identified sentences of the document to identify nouns, each identified noun corresponding to an object, and identify one or more attributes associated with each corresponding object;
    create first key-value data structures mapping each corresponding object to its identified one or more associated attributes;

identify from created first key-value data structures, any associated attributes of a corresponding object that reference another object;
for each corresponding object, create a second key-value data structure, each second key-value structure mapping each corresponding object's attribute identified as an object reference to a corresponding key value identifying the another object being referred, the instructions further causing the electronic device to:
obtain a first key-value data structure of an object;
obtain identified object references for an object from said second key-value data structure;
compare the obtained first key-value data structures against each identified object reference;
identify an object having no reference as an atom object;
set a degree of encapsulation of the object based on the references key-value pair against the identified atom object; and
generate an OODB schema based on the first key-values data and second key-value data structure mappings, the identified atom object, and the encapsulation degree of the objects of second key-value data structure mappings.

9. The computer program product of claim 8, the instructions further causing the electronic device to:
parse through identified sentences of the document and identify combinations of text characters;
iterate over the ASCII characters combination for each sentence to obtain the ASCII character combination of a word;
compare the ASCII combination of the word against words in an object-oriented specific ASCII data dictionary;
identify any word of any sentence is a proper noun or a responsibility of a noun.

10. The computer program product of claim 8, wherein to create said second key-value data structures, the instructions further causing the electronic device to:
iterate through the created first key-value data structures mapping each corresponding object to one or more associated attributes; and
for a current object, check if an identified current object's attribute value links to another object; and
upon determining of a linkage to said another object, obtain a key where the reference is found as an attribute; and
store said reference in the second key-value data structure with the object as the key and object references as its values.

11. The computer program product of claim 8, the instructions further causing the electronic device to:
obtain from said second key-value data structures a level of encapsulation of the requirement from the references values linking to other objects, said electronic device generating said OODB schema by further using said identified atomic object, said encapsulation degree and said encapsulation level of said requirement.

12. The computer program product of claim 8, wherein said requirements text document includes a hashtag link, the instructions further causing the electronic device to:
identify from said text document said hashtag link; and
interpret said hashtag link as one of an object for said generated OODB schema or an atom object.

13. The computer program product of claim 9, the instructions further causing the electronic device to:
detect an erroneous identification of an object and/or an object's erroneous metadata;
train a machine learned model to learn an error based on said erroneous identified object and/or its meta data; and
update a word representing said object in said object-oriented specific ASCII data dictionary to include said erroneous identified object and/or meta data error.

14. The computer program product of claim 9, the instructions further causing the electronic device to:
detect occurrence of a requirements text update being added to said text document;
process said requirements text update to identify an object and any object attributes, create a further first key-value data structure mapping the identified object to one or more associated attributes, create a further second key-value data structure to map any object attribute identified as an object reference to another object with a corresponding key value identifying that object; and
update said OODB schema based on said created further first key-value data and second key-value structures.

15. A computing system comprising a computer processor coupled to a computer-readable memory unit, the memory unit comprising instructions that when executed by the computer processor implements a method comprising:
receiving a text document indicating one or more requirements of an underlying object-oriented system, and using a processor to identify ASCII-character based sentences in said text;
using a processor to parse through identified sentences of the document to identify nouns, each noun corresponding to an object, and identify any attributes associated with each corresponding object;
using the processor to create first key-value data structures mapping each corresponding object to one or more associated attributes;
using the processor to identify from created first key-value data structures any associated attributes of a corresponding object that reference another object;
for each corresponding object, using the processor to create a second key-value data structure, each second key-value structure mapping each corresponding object's attribute identified as an object reference to a corresponding key value identifying the another object being referred;
obtaining, using the processor, a first key-value data structure of an object;
obtaining, using the processor, identified object references for an object from said second key-value data structure;
comparing, using the processor, the obtained first key-value data structures against each identified object reference;
identifying, using the processor, an object having no reference as an atom object;
setting, using the processor, a degree of encapsulation of the object based on the references key-value pair against the identified atom object; and
generating, using said processor, an OODB schema based on the first key-values data and second key-value data structure mappings, the identified atom object, and the encapsulation degree of the objects of second key-value data structure mappings.

16. The system as claimed in claim 15, wherein the method further comprises:
using the processor to iterate through the created first key-value data structures mapping each corresponding object to one or more associated attributes; and
for a current object, checking, using the processor, if current object's attribute value links to another object;

upon determining of a linkage to said another object, obtaining a key where the reference is found as an attribute; and storing said reference in the second key-value data structure with the object as the key and object references as its values; and obtaining, using the processor, a first key-value data structure of an object; and obtaining, using the processor, identified object references for an object from said second key-value data structure;

comparing, using the processor, the obtained first key-value data structures against each identified object reference; and identifying, using the processor, an object having no reference as an atom object.

* * * * *